US012589739B2

(12) United States Patent
Ventura

(10) Patent No.: US 12,589,739 B2
(45) Date of Patent: Mar. 31, 2026

(54) METHOD FOR MONITORING A LANE CHANGE OF A VEHICLE

(71) Applicant: Robert Bosch GmbH, Stuttgart (DE)

(72) Inventor: Jacopo Ventura, Augsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 156 days.

(21) Appl. No.: 18/497,413

(22) Filed: Oct. 30, 2023

(65) Prior Publication Data

US 2024/0174222 A1 May 30, 2024

(30) Foreign Application Priority Data

Nov. 24, 2022 (DE) ...................... 10 2022 212 567.3

(51) Int. Cl.
B60W 30/09 (2012.01)
B60W 30/095 (2012.01)
(Continued)

(52) U.S. Cl.
CPC ........ B60W 30/09 (2013.01); B60W 30/0956 (2013.01); B60W 30/18163 (2013.01);
(Continued)

(58) Field of Classification Search
CPC ............. B60W 30/09; B60W 30/0956; B60W 30/18163; B60W 40/105; B60W 40/107;
(Continued)

(56) References Cited

U.S. PATENT DOCUMENTS

| | | | | |
|---|---|---|---|---|
| 7,729,841 B2 * | 6/2010 | Knoop | .................. | B60W 30/08 |
| | | | | 180/197 |
| 11,654,902 B1 * | 5/2023 | Dingli | ................... | B60W 40/12 |
| | | | | 701/93 |

(Continued)

FOREIGN PATENT DOCUMENTS

| | | |
|---|---|---|
| DE | 102004029369 A1 | 6/2006 |
| DE | 102015209974 A1 | 12/2016 |
| DE | 102018109885 A1 | 12/2018 |

OTHER PUBLICATIONS

Peng et al., A new safe lane-change trajectory model and collision avoidance control method for automatic driving vehicles, Sep. 13, 2019, Expert Systems With Applications 141, Elsevier, pp. 1-17 (Year: 2019).*

(Continued)

*Primary Examiner* — Sze-Hon Kong
(74) *Attorney, Agent, or Firm* — NORTON ROSE FULBRIGHT US LLP

(57) ABSTRACT

A method for monitoring a lane change of a vehicle. The method includes: ascertaining a collision point on the basis of a movement specification, wherein the movement specification is specific for a planned movement of the vehicle along a path for carrying out the lane change; checking for a possible collision of the vehicle with a road user on the basis of the ascertained collision point and at least one state parameter of the vehicle; determining an adjustment specification to avoid the possible collision; and providing the adjustment specification to monitor the lane change.

8 Claims, 3 Drawing Sheets

(51) Int. Cl.

| | | |
|---|---|---|
| *B60W 30/18* | (2012.01) | |
| *B60W 40/105* | (2012.01) | |
| *B60W 40/107* | (2012.01) | |
| *B60W 60/00* | (2020.01) | |

(52) U.S. Cl.

CPC ........ *B60W 40/105* (2013.01); *B60W 40/107* (2013.01); *B60W 60/0015* (2020.02); *B60W 2520/105* (2013.01); *B60W 2554/4045* (2020.02)

(58) Field of Classification Search

CPC ....... B60W 60/0015; B60W 2520/105; B60W 2554/4045; B60W 30/0953; B60W 2554/804; B60W 40/109

See application file for complete search history.

(56) References Cited

U.S. PATENT DOCUMENTS

| | | | | |
|---|---|---|---|---|
| 12,077,186 | B1 * | 9/2024 | Schleede | .......... B60W 60/0016 |
| 12,162,500 | B1 * | 12/2024 | Egbert | ............. B60W 50/0205 |
| 2004/0193374 | A1 * | 9/2004 | Hac | ........................ G08G 1/166 701/301 |
| 2017/0174261 | A1 * | 6/2017 | Micks | .................. B62D 15/029 |
| 2017/0320500 | A1 * | 11/2017 | Yoo | ................... B60W 30/0956 |
| 2019/0031190 | A1 * | 1/2019 | Choi | ..................... B60W 10/10 |
| 2019/0391580 | A1 * | 12/2019 | Di Cairano | ........... G08G 1/165 |
| 2020/0148261 | A1 * | 5/2020 | Varunjikar | ......... B62D 15/0265 |
| 2020/0290608 | A1 * | 9/2020 | Liu | ........................... G06N 3/08 |
| 2021/0053570 | A1 * | 2/2021 | Akella | ............ B60W 30/18163 |
| 2021/0114617 | A1 * | 4/2021 | Phillips | ............. G01C 21/3453 |
| 2021/0229656 | A1 * | 7/2021 | Dax | ................. G08G 1/096811 |
| 2023/0202471 | A1 * | 6/2023 | Yu | ..................... B60W 30/0956 701/26 |
| 2023/0274646 | A1 * | 8/2023 | Roidl | .................. B60W 30/095 701/117 |
| 2023/0339465 | A1 * | 10/2023 | Althoff | ............. B60W 30/0956 |
| 2024/0059285 | A1 * | 2/2024 | Ng | ......................... B60W 50/14 |
| 2024/0123983 | A1 * | 4/2024 | Morimoto | ............ B60W 30/09 |
| 2025/0157333 | A1 * | 5/2025 | Gabriel | ................. B60W 30/09 |

OTHER PUBLICATIONS

Jula et al., Collision Avoidance Analysis for Lane Changing and Merging, Nov. 2000, IEEE Transactions on Vehicular Technology, vol. 49, No. 6, pp. 2295-2308 (Year: 2000).*

* cited by examiner $y_{path\_participant}(x)$ 40  30

$y_{path\_vehicle}(x)$

2 y o  x  1

$y_{path\_participant}(x1)$ $y_{path\_participant}(x2)$

40

2 width participant /2

$y_{path\_vehicle}(x2)$ width vehicle /2

$y_{path\_vehicle}(x1)$ y o  x1  x2  x 1  30

METHOD FOR MONITORING A LANE CHANGE OF A VEHICLE

CROSS REFERENCE

The present application claims the benefit under 35 U.S.C. § 119 of German Patent Application No. DE 10 2022 212 567.3 filed on Nov. 24, 2022, which is expressly incorporated herein by reference in its entirety.

FIELD

The present invention relates to a method for monitoring a lane change of a vehicle. The present invention also relates to a computer program and to a device for this purpose.

BACKGROUND INFORMATION

It is conventional for a lane change in vehicles to be carried out autonomously. Information relating to the surroundings of the vehicle and to a vehicle state such as a vehicle speed is used for this purpose.

Conventional driver assistance systems and autonomous driving functions are often still limited in usability, for example depending on the weather conditions, the visibility of roadway markings, etc.

The reliability, for example of the control of an autonomous lane change, is therefore often also limited.

SUMMARY

The present invention provides a method, a computer program, and a device. Further features and details of the present invention will become apparent from the disclosure herein. Here, features and details which are described in connection with the method according to the present invention also apply, of course, in connection with the computer program according to the present invention and the present device according to the present invention, and vice versa in each case, so that, with regard to the disclosure, individual aspects of the present invention always refer or can refer to one another.

The present invention provides a method for monitoring a lane change of a vehicle, also referred to below as an ego vehicle. Monitoring can be understood to mean influencing, preferably adjusting and/or controlling and/or securing, the lane change. Accordingly, the lane change can be a lane change carried out at least partially or completely autonomously by the vehicle. The vehicle can therefore be designed as an autonomous vehicle and/or a passenger vehicle that has an autonomous and/or driver assistance vehicle function. The vehicle function can, for example, control the acceleration and/or steering of the vehicle autonomously, i.e., without driver intervention, in order to carry out the lane change.

According to an example embodiment of the present invention, the method can have the following steps, which are preferably carried out successively and/or repeatedly:

ascertaining a collision point on the basis of a movement specification, preferably a movement path, wherein the movement specification is specific for a planned movement of the vehicle along a path, in particular of the movement path, for carrying out the lane change, checking for a possible collision of the vehicle with an (other) road user, in particular a further vehicle, on the basis of the ascertained collision point and/or at least one state parameter of the vehicle, determining an adjustment specification to avoid the possible collision, providing the adjustment specification to monitor the lane change.

The method thus has the advantage that the lane change can be monitored, i.e., checked and/or controlled, for example, to the effect that a collision resulting from the lane change is avoided. The movement specification can indicate the path which is provided for the lane change. This can have been calculated previously by a corresponding vehicle function, for example. It is also possible for such a path to be ascertained for the road user, and thus for the movement and the positions of the vehicle and of the road user for the lane change to be predicted.

The method according to an example embodiment of the present invention can furthermore have the advantage that it is ensured that there is no collision of the vehicle with other road users toward which the vehicle is traveling. In particular, according to the method, it can first be checked whether the path of the vehicle and a path of the road user have a collision point. The road user is accordingly a further vehicle. In particular, the first point from the current position of the vehicle, at which the two vehicles are too close to one another and could collide, can be understood as a collision point. If a collision point is found, it can be checked whether or not a collision takes place between the two vehicles by estimating the time that the two vehicles require to reach the collision point. If the vehicle and the road user reach the collision point in the same time interval, the collision is expected. In this case, it can be estimated whether the vehicle is to brake or accelerate in order to change the lane without a collision. It is advantageous if the ego vehicle brakes when it is located behind the road user at the time of the collision, otherwise it should accelerate. As soon as the movement behavior is evaluated, a trajectory can optionally be calculated by estimating the time stamp for each waypoint of the path.

Furthermore, it is possible within the scope of the present invention for the ascertainment of the collision point to comprise the following steps:

ascertaining the path for carrying out the lane change, ascertaining a path along which a movement of the road user is predicted, comparing the ascertained paths, wherein the collision point is ascertained on the basis of the comparison.

For example, the collision point can be ascertained by ascertaining the positions of the vehicle and the road user depending on the speed thereof and depending on time. If the vehicles come too close, this can be assessed as a possible collision. For this purpose, for example, a time interval and/or a spatial danger zone is defined, such as a radius within which the vehicles have to be located in order for this to be evaluated as a possible collision. This has the advantage that the probability of a possible collision can be estimated reliably.

Further advantageously, according to an example embodiment of the present invention, checking for the possible collision comprises the following steps:

calculating a time period that the vehicle requires to reach the collision point, preferably on the basis of the at least one state parameter, calculating a time period that the road user requires to reach the collision point, preferably on the basis of at least one state parameter of the road user, comparing the calculated time periods, wherein the check predicts the collision on the basis of the comparison.

This makes it possible to estimate the probability of collision.

Furthermore, according to an example embodiment of the present invention, it is optionally provided for the determination of the adjustment specification to comprise a calculation of an acceleration behavior of the vehicle suitable for avoiding the possible collision. For example, one or more accelerations along a trajectory that are necessary to avoid the collision safely and/or to maximize the distance between the vehicle and the road user can be calculated.

In addition, it is possible within the scope of the present invention for a trajectory for a collision-free lane change to be determined on the basis of the adjustment specification, in particular of the calculated acceleration behavior of the vehicle. The acceleration behavior can be understood to mean, for example, a sequence of acceleration and/or braking maneuvers along the trajectory. The lane change can thus be controlled such that a safety distance between the vehicles is maintained.

It can preferably be provided within the scope of the present invention for the road user to be a further vehicle, wherein a list of multiple detected vehicles (in the surroundings of the ego vehicle) is provided, and the road user is selected from the list. The vehicles are detected, for example, on the basis of a recording by a radar and/or a camera. Furthermore, after the method steps have been selected and carried out for the selected road user, a further of the detected vehicles can subsequently be selected as a road user, and the method steps can be carried out again for this. This can be repeated for all detected vehicles. It is thus possible to evaluate fully the risk of collision for all detected vehicles in the surroundings of the ego vehicle.

Furthermore, it is optionally possible within the scope of the present invention for the movement specification and/or the state parameter to be ascertained by a measurement of the vehicle speed, and preferably to be provided by a driver assistance system and/or an autonomous vehicle function. The present invention thus enables a safe, i.e., collision-free, autonomous lane change, in particular for overtaking other vehicles and/or for avoiding collision and/or for lane change due to lane interruption (accident, obstacle, construction site). The method thus also provides an improved algorithm for calculating collision-free trajectories, which can enable an at least partial autonomous lane change.

According to an example embodiment of the present invention, it is also possible for the adjustment specification to be provided for a driver assistance system and/or an autonomous vehicle function, wherein a control of the vehicle is initiated on the basis of the adjustment specification, in particular of the calculated acceleration behavior of the vehicle and/or of the trajectory, in order to carry out the lane change by a driver assistance system and/or an autonomous vehicle function (also referred to as driving function). In this case, it is possible for the method to be used for a software platform for autonomous driving, in particular for providing a "hands-free autopilot", i.e., an autonomous driving function, in which the vehicle can be controlled without intervention by a driver. In this case, it is possible, for example, for the driving function to provide a lane change on a freeway. Furthermore, it is possible for the driving function to maintain a constant driving speed and to maintain a distance from a vehicle traveling ahead. Furthermore, the driving function can optionally automatically and safely switch the lane without human intervention, to overtake other vehicles or to avoid collisions with obstacles on the roadway. In this case, obstacles can optionally include all possible lane obstacles that cause the vehicle to change lane, for example barriers in construction site areas, car accidents, slow trucks, interruptions in the lane and objects on the road.

The present invention also relates to a computer program, in particular a computer program product, comprising commands which, when the computer program is executed by a computer, cause the computer to carry out the method according to the present invention. The computer program according to the present invention thus brings with it the same advantages as have been described in detail with reference to a method according to the present invention.

The present invention also relates to a device for data processing that is configured to carry out the method according to the present invention. The device provided can be, for example, a computer that executes the computer program according to the present invention. The computer can have at least one processor for executing the computer program. A non-volatile data memory can also be provided, in which the computer program is stored and from which the computer program can be read by the processor for execution.

The present invention also relates to a computer-readable storage medium which comprises the computer program according to the present invention. The storage medium is designed, for example, as a data store such as a hard drive and/or a non-volatile memory and/or a memory card. The storage medium can be integrated into the computer, for example.

Furthermore, the method according to the present invention can also be carried out as a computer-implemented method.

Further advantages, features and details of the present invention will become apparent from the following description, in which exemplary embodiments of the present invention are described in detail with reference to the figures. The features disclosed herein can be essential to the present invention in each case individually or in any combination.

DETAILED DESCRIPTION OF EXAMPLE EMBODIMENTS

In the following figures, identical reference signs are also used for the same technical features of different embodiments.

The method 100 according to exemplary embodiments of the present invention can be provided for monitoring a lane change of a vehicle 1 and preferably for calculating a collision-free trajectory for the lane change of the vehicle 1, also referred to as an ego vehicle. In particular, the method 100 can initially check whether or not a collision with another road user 2 will take place during the lane change. A collision-free lane change trajectory can then be calculated.

Figures 1, 2:
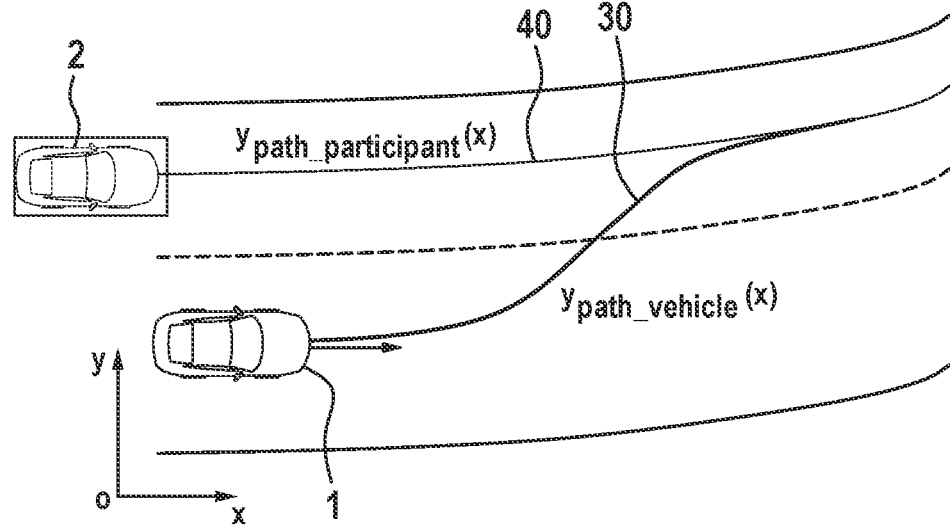
FIG. 1 shows a schematic representation of the input data for the method according to exemplary embodiments of the present invention.
FIG. 2 shows a schematic representation of the collision checking logic, according to an example embodiment of the present invention.

In FIG. 1, the path 30 of the vehicle 1 is defined in the coordinate system $\{O, x, y\}$ by the function $y_{path\_vehicle}(x)$, while the path 40 of the road user is defined by the function $y_{path\_participant}(x)$. The further lines define the road.

The inputs for the calculation can be:

a state parameter for a current state of the ego vehicle 1, for example position, speed, orientation, in particular ascertained by odometry, and/or a path 30 of the ego vehicle 1 for carrying out the lane change, preferably defined as the function $y_{path\_vehicle}(x)$, and/or an expected speed of the vehicle 1 at the end of the path 30, and/or a list of the road users 2, i.e., the objects representing the other vehicles, preferably with their path 40, preferably defined as the function $y_{path\_participant}(x)$.

Figure 3:
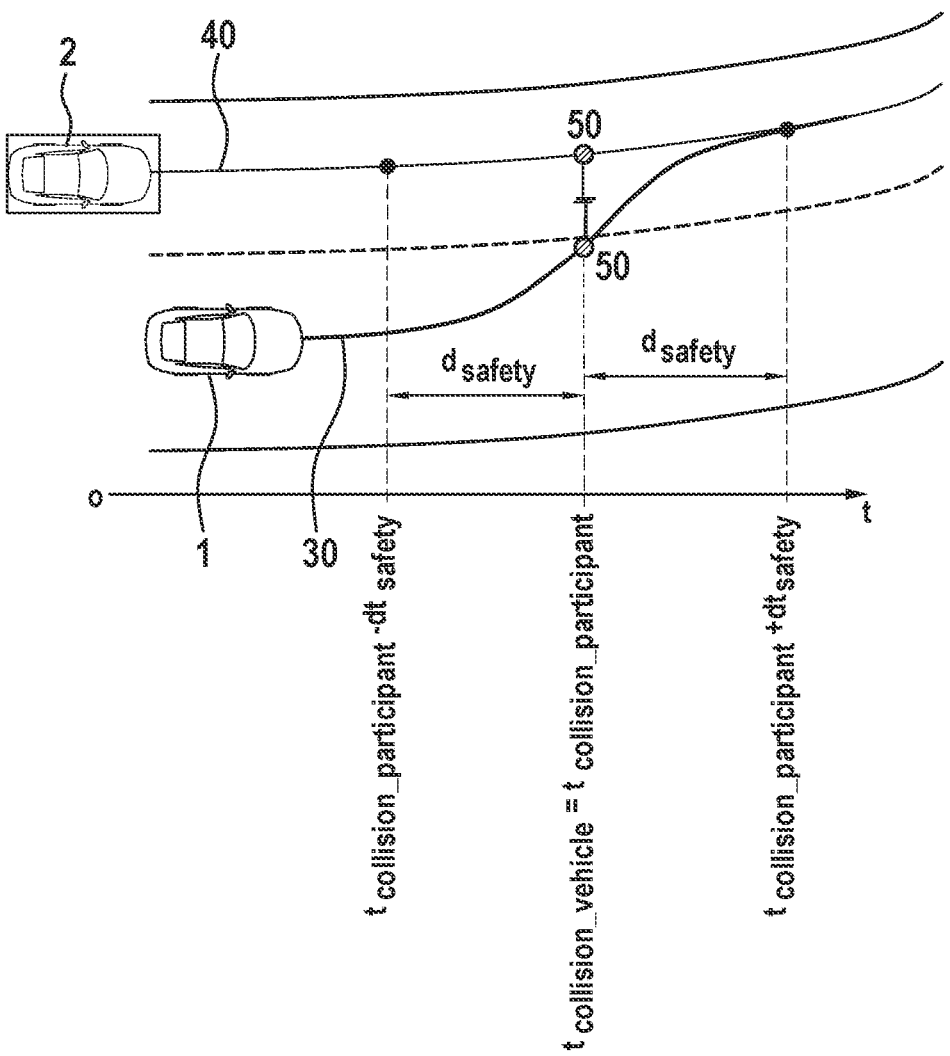
FIG. 3 schematically shows a condition to check whether the collision occurs, according to an example embodiment of the present invention.
Figure 4:
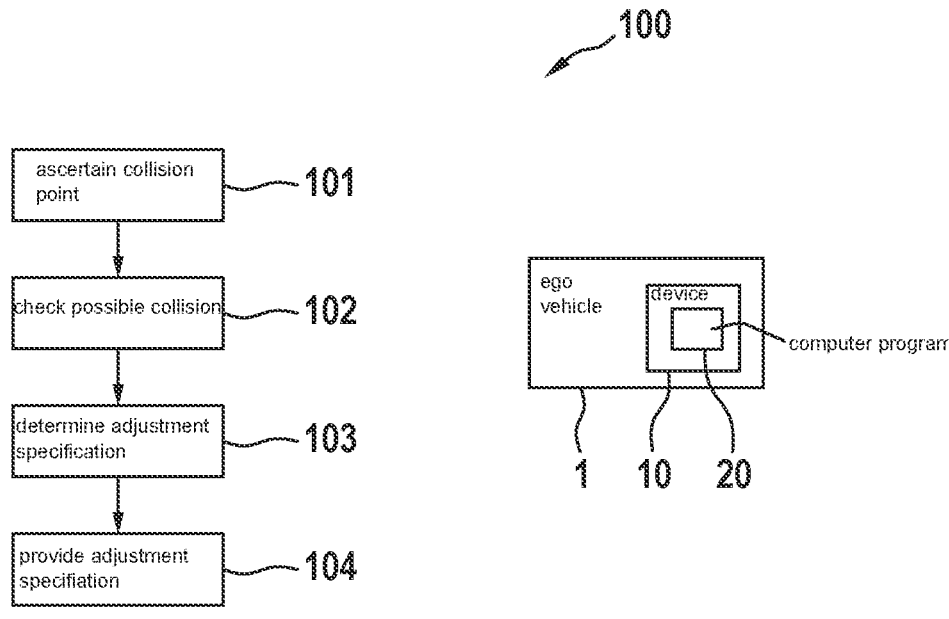
FIG. 4 schematically shows a method, a computer program, and a device according to exemplary embodiments of the present invention.

FIG. 4 shows the method steps of a method 100 according to exemplary embodiments of the present invention. In a first method step 101, the method 100 can ascertain a collision point 50 shown in FIG. 3 on the basis of a movement specification. The movement specification can be specific for a planned movement of the vehicle 1 along a path 30 for carrying out the lane change. Subsequently, according to a second method step 102, a possible collision of the vehicle 1 with a road user 2 can be checked on the basis of the ascertained collision point 50 and at least one state parameter of the vehicle 1. It can thereby be evaluated whether a collision is likely to take place. The state parameter is, for example, a speed of the vehicle 1, but can also include a position and/or an orientation of the vehicle 1. According to a third method step 103, an adjustment specification can be determined to avoid the possible collision. For example, a speed of the vehicle 1 at the collision point 50 can be calculated in such a way that the collision is avoided. Subsequently, according to a fourth method step 104, the adjustment specification can be provided to monitor the lane change. This can comprise, for example, a calculation of a collision-free trajectory of the vehicle 1. Monitoring is understood to mean, for example, initiation and/or adjustment of the lane change, preferably such that a collision can be avoided.

A trajectory can be characterized in that the position of the vehicle 1 is indicated over time t (see FIG. 3). For this purpose, paths and trajectories can be defined in a coordinate system, the x-axis of which is aligned with the speed vector of the vehicle 1 (see FIGS. 1 and 2).

Furthermore, it is possible for the ascertainment 101 of the collision point 50 to comprise the following steps:

ascertaining the path 30 for carrying out the lane change, ascertaining a path 40 along which a movement of the road user 2 is predicted, comparing the ascertained paths, wherein the collision point is ascertained on the basis of the comparison.

Furthermore, FIG. 4 shows a computer program 20 and a device 10 for data processing according to exemplary embodiments of the present invention.

The individual method steps 101-104 are described below with further details.

It is possible for the road user 2 to denote a further vehicle that was previously selected from a list of the vehicles detected within the surroundings of the ego vehicle 1. Accordingly, the first method step 101 can comprise ascertaining an expected collision point 50 between the path 30 of the (ego) vehicle 1 and the path 40 of the selected road user 2. This can be done by calculating the expected collision point 50 between the path 30 of the vehicle 1 for the lane change and the path 40 of the road user 2. To this end, the expected collision point 50 $(x_{collision}, y_{collision})$ can first be initialized as $(0, 0)$. A loop can then be initiated via the path 30 of the vehicle 1 with a step dx until the end of the path 30. The new x coordinate can be calculated by:

$$x' = x' + dx$$

The y-coordinate on the path 30 of the vehicle 1 and on the path 40 of the road user 2 at x can be calculated as follows:

$$y_{vehicle} = y_{path\_vehicle}(x')$$

$$y_{participant} = y_{path\_participant}(x')$$

The following procedure can be used to check for the collision point 50:

If $y_{participant} > y_{vehicle}$, the road user 2 travels on the left lane in relation to the monitored vehicle 1. In this case, the vehicle 1 collides with the road user 2 at the waypoint $(x, y_{vehicle})$ if $$y_{participant} - width_{participant}/2 < y_{vehicle} + width_{vehicle}/2.$$

If $y_{participant} < y_{vehicle}$, the road user 2 travels on the right lane in relation to the monitored vehicle 1. In this case, the vehicle 1 collides with the road user 2 at the waypoint $(x, y_{vehicle})$ if $$y_{participant} + width_{participant}/2 > y_{vehicle} - width_{vehicle}/2.$$

This test condition is shown graphically in FIG. 2. At the coordinate x1, the distance between the points $(x1, y_{path\_vehicle}(x1))$ and $(x1, y_{path\_participant}(x1))$ is greater than half the widths of the two vehicles 1, 2, therefore $(x1, y_{path\_vehicle}(x1))$ is not an expected collision point 50. At the coordinate x2, the distance between the points $(x2, y_{path\_vehicle}(x2))$ and $(x2, y_{path\_participant}(x2))$ is shorter than half the widths of the two vehicles 1, 2, therefore $(x2, y_{path\_vehicle}(x2))$ is the expected collision point 50. The further lines define the road.

If a collision is detected, the collision point 50 is updated as $$x_{collision} = x'$$

$$y_{collision} = y_{vehicle}$$

and the loop is exited. Otherwise, the process can return to the step of calculating the X coordinate. The output of the method step 101 can be the expected collision point 50 $(x_{collision}, y_{collision})$ and the position of the road user 2 at the time of the collision. However, it should be noted that the estimation of the collision point 50 between the path of the vehicle 1 and the path of the road user 2 does not guarantee that the two vehicles 1 are actually colliding. Rather, the collision occurs when the two vehicles 1 reach the expected collision point 50 at the same time t or in the same time period.

In the second method step 102, it can be evaluated whether a collision is likely to occur. In other words, this step checks whether or not a collision takes place between the vehicle 1 and the road user 2 at the expected collision point 50. The condition for the occurrence of a collision is that the vehicle 1 and the road user 2 arrive at the expected collision point 50 at the same time or in the same time period, wherein a tolerance such as a time interval can be taken into account. For this purpose, it can first be checked whether $(x_{collision}, y_{collision}) = (0,0)$. In this case, the flag variable Flag_collision=False is set. Otherwise, the process can be continued as follows with a calculation with which the distance between the current position $(x0_{\{vehicle, participant\}}, y0_{\{vehicle, participant\}})$ and the expected position during the collision is calculated both for the vehicle 1 and for the road user 2:

$$d_{vehicle}=[(x_{collision}-x0_{vehicle})^2+[(y_{vehicle}-y0_{vehicle})^2]^{0.5}$$

$$d_{participant}=[(x_{collision}-x0_{participant})^2+(y_{participant}-y0_{participant})^2]^{0.5}$$

The following equation allows an estimation of the time required to reach the expected collision points 50, wherein the equation is solved both for the vehicle 1 and for the road user 2:

$$d(t)=v0*t+0.5*\alpha*t^2,$$

wherein the time t is the unknown. The parameter d is the distance between the current position and the previously calculated expected collision point, v0 is the current speed (norm), and a is the expected average acceleration. Here, v0 of the vehicle 1 can be available from the odometry data, whereas v0 of the road user 2 can be available from its tracking (for example by means of a Kalman filter). If no acceleration profile is present, the acceleration can be set as the current value. Alternatively, if an acceleration profile is available, the acceleration used in the previous equation can be set as an average. The solution of the previous equation provides the time up to the collision point 50:

$$t_{collision}=(-2*v0+\Delta^{0.5})/(2*\alpha),$$

wherein $$\Delta=4*v0^2-8*\alpha*(-d).$$

The time until the collision for the vehicle 1 is $t_{collision\_vehicle}$, the time until the collision for the road user 2 is $t_{collision\_participant}$.

The time that a road user 2 requires to cover the safety distance $d_{safety}$ at the collision point 50 can be estimated as follows $$dt_{safety}=d_{safety}/v_{collision\_participant},$$

wherein $v_{collision\_participant}$ is the speed of the road user 2 at the collision point 50, calculated as $v_{collision\_participant}=v0_{participant}+\alpha_{participant}*t_{collision}$ participant. In particular, $d_{safety}$ is a safety distance that the vehicle 1 has to maintain from other vehicles 1 during an overtaking operation.

FIG. 3 graphically shows the safety distance during the collision. The vehicle 1 reaches the collision point 50 at exactly the same time as the road user 2. If the vehicle 1 reaches the collision point 50 in the time interval $[t_{collision\_participant}-dt_{safety}, t_{collision\_participant}]$, the vehicle 1 would be behind the road user 2, and the vehicle 1 should brake in order to avoid the collision. If the vehicle 1 reaches the collision point 50 in the time interval $[t_{collision\_participant}, t_{collision\_participant}+dt_{safety}]$, the vehicle 1 would be in front of the road user 2, and the vehicle 1 should accelerate in order to avoid the collision. Subsequently, a calculation of the time interval can be provided in which the road user 2 covers the section $2*d_{safety}$ to the expected collision point 50 ($x_{collision}$, $y_{participant}$) in a centered manner:

$$\Delta t_{collision\_participant}=[t_{collision\_participant\_tmin}, t_{collision\_participant\_max}]$$

wherein $$t_{collision\_participant\_min}=t_{collision\_participant}-dt_{safety}$$

$$t_{collision\_participant_{max}}=t_{collision\_participant}+dt_{safety}$$

An evaluation can then be provided as to whether the collision between the vehicle 1 and the road user 2 will take place. The condition for the occurrence of the collision can be:

$$t_{collision\_vehicle}\in\Delta t_{collision\_participant}$$

The above condition means that, when the vehicle 1 reaches the expected collision point 50, the road user 2 is also located at the expected collision point 50 (if $t_{collision\_participant}=t_{collision\_vehicle}$), or the distance of the road user 2 from the vehicle 1 is shorter than $d_{safety}$, which means a dangerous situation that should be avoided.

If $t_{collision\_vehicle}\in[t_{collision\_participant\_min}; t_{collision\_participant}]$, the vehicle 1 is located in front of the road user 2.

If $t_{collision\_vehicle}\in[t_{collision_{participant}}; t_{collision\_participant\_max}]$, in contrast, the vehicle 1 is located behind the road user 2.

If the condition for the collision is met, the flag variable Flag_collision=True is set. This step generates the flag variable Flag_collision, which is true when the condition for the collision is true.

According to the third method step 103, a calculation of the speed of the vehicle 1 at the collision point 50 can be provided first, so that the collision is avoided. In particular, it is evaluated whether the vehicle 1 is to accelerate or brake in the event of a collision. Likewise, the speed at the collision point 50 can be calculated so that the collision is avoided. This is shown by way of example below:

If an occurrence of the collision was predicted, i.e., Flag_collision=True, the behavior of the vehicle 1 that is necessary to avoid the collision is determined first:

If $t_{collision\_vehicle}\in[t_{collision\_participant}; t_{collision\_participant\_max}]$, the vehicle 1 is back behind the road user 2 by a distance which is smaller than $d_{safety}$ at the time at which it reaches the collision point 50. In order to avoid this dangerous situation, the vehicle 1 has to reach the collision point 50 at a distance greater than $d_{safety}$ from the road user 2. In order to ensure this, the vehicle 1 can brake, and the new time up to the collision for the vehicle 1 is:

$$t_{collision\_vehicle\_safe}=t_{collision\_vehicle}+dt_{safety}.$$

Due to the deceleration of the vehicle 1 by a time of $d_{safety}$, it is made possible for the road user 2 to drive a section $d_{safety}$ additionally in front of the vehicle 1.

If $t_{collision\_vehicle}\in[t_{collision\_participant\_min}; t_{collision_{participant}}]$, the vehicle 1 is ahead of the road user 2 by a shorter distance than $d_{safety}$ at the time of reaching the collision point 50. In order to avoid this dangerous situation, the vehicle 1 has to reach the collision point 50 at a distance greater than $d_{safety}$ from the road user 2. In order to ensure this, the vehicle 1 can accelerate, and the new time up to the collision for the vehicle 1 is:

$$t_{collision\_vehicle\_safe}=t_{collision\_vehicle}-dt_{safety}.$$

Because the vehicle 1 is accelerated by a time of $d_{safety}$, it is made possible for the road user 2 to reach the expected collision point 50 before the road user 2 covers a section $d_{safety}$ behind the vehicle 1. The condition that evaluates whether the collision occurs is schematically shown in FIG. 3.

The speed norm of the vehicle 1 at the collision point 50 can be calculated as follows:

$$v_{vehicle\_at\_collision}=2*(d_{vehicle}/t_{collision\_vehicle\_safe})-v0_{vehicle},$$

wherein $v0_{vehicle}$ is the norm of the current speed of the vehicle 1, and the term $d_{vehicle}/t_{collision\_vehicle\_safe}$ is the average speed norm of the vehicle 1 from the current position up to the collision point 50 (i.e., the average speed along the segment $d_{vehicle}$).

According to the fourth method step 104, the collision-free trajectory of the vehicle 1 can be calculated. For this purpose, the trajectory of the vehicle 1 for the lane change can be calculated on the basis of the route, i.e., of the path 30, of the vehicle 1 $y_{(path\_vehicle)}(x)$ and the speed at the collision point 50 $v_{vehicle\_at\_collision}$.

If the collision was predicted, i.e., $Flag_{collision}$=True, the trajectory can be calculated as described above. Otherwise, the procedure can be as follows: First, the duration of the maneuver can be calculated as $$t_{maneuver} = \text{path length}/v^-$$

wherein $v$ is the average speed norm, which is calculated on the basis of the current speed ($v0x_{vehicle}$, $v0y_{vehicle}$) and the expected speed at the end of the section ($vFx_{vehicle}$, $VFy_{vehicle}$).

The average accelerations in the x and y directions can then be calculated as $$\overline{\alpha}_x = (vFx_{vehicle} - v0x_{vehicle})/t_{maneuver}$$

$$\overline{\alpha}_y = (vFy_{vehicle} - v0y_{vehicle})/t_{maneuver},$$

wherein $vF\{x,y\}_{vehicle}$ are the components of the end speed of the vehicle 1.

It can then be checked that the average accelerations do not exceed the limit values:

if ($\overline{\alpha}_x > \alpha_{max\_x}$ & $\overline{\alpha}_y <= \alpha_{max\_y}$), the acceleration is satisfied as $\overline{\alpha}_x = \text{sign}(\overline{\alpha}_x) * \alpha_{max\_x}$, the maneuver time is recalculated as $t_{maneuver} = (vFx_{vehicle} - v0x_{vehicle})/\overline{\alpha}_x$, and the value of the other acceleration component is updated as $\overline{\alpha}_y = (vFy_{vehicle} - v0y_{vehicle})/t_{maneuver}$.

if ($\overline{\alpha}_x <= \alpha_{max\_x}$ & $\overline{\alpha}_y > \alpha_{max\_y}$), the acceleration is satisfied as $\overline{\alpha}_y = \text{sign}(\overline{\alpha}_y) * \alpha_{max\_y}$, the maneuver time is recalculated as $t_{maneuver} = (vFy_{vehicle} - v0y_{vehicle})/\overline{\alpha}_y$, and the value of the other acceleration component is updated as $\overline{\alpha}_x = (vFx_{vehicle} - v_0x_{vehicle})/t_{maneuver}$.

if ($\overline{\alpha}_x > \alpha_{max\_x}$ & $\overline{\alpha}_y > \alpha_{max\_y}$), the acceleration is satisfied as $\overline{\alpha}_y = \text{sign}(\overline{\alpha}_y) * \alpha_{max\_y}$, $\overline{\alpha}_x = \text{sign}(\overline{\alpha}_x) * \alpha_{max\_x}$.

A loop via the vehicle path can then be created with a step $\Delta x$. For each new x coordinate, the following equation is to be solved in order to ascertain the time t at which the vehicle 1 reaches the waypoint ($x, y_{path\_vehicle}(x)$):

$$x(t) = x0 + v0x * t + 0.5 * \overline{\alpha}_x * t^2$$

The solution is $$t_{waypoint} = (-2 * v0x + \Delta^{0.5})/(2 * \overline{\alpha}_x),$$

wherein $$\Delta = 4 * v0x^2 - 8 * \overline{\alpha}_x * (x0 - x).$$

Then the trajectory waypoints ($t_{waypoint}, x$) and ($t_{waypoint}, y_{path\_vehicle}(x)$) can be stored.

Subsequently, the trajectory of the vehicle 1 from the current position ($x_0$, $y_0$) up to the collision point 50 ($x_{collision}$, $y_{collision}$) can be calculated by means of the following routine:

First, a calculation of the tangent vector at $y_{path\_vehicle}$ (xcollision) and a calculation of the components of the speed vector at the collision point 50 using the tangent and the norm $v_{vehicle\_at\_collision}$ can be provided. The components are denoted $vx_{vehicle\_at\_collision}$ and $vy_{vehicle\_at\_collision}$. The average accelerations along the x and y directions can then be calculated as $$\overline{\alpha}x = (vx_{vehicle\_at\_collision} - v0x_{vehicle})/t_{collision\_vehicle\_safe}$$

$$\overline{\alpha}y = (vy_{vehicle\_at\_collision} - v0y_{vehicle})/t_{collision\_vehicle\_safe}$$

It is then checked whether the average accelerations do not exceed the limit values.

If ($\overline{\alpha}_x > \alpha_{max\_x}$ & $\overline{\alpha}_y <= \alpha_{max\_y}$), the acceleration is satisfied as $\overline{\alpha}_x = \text{sign}(\overline{\alpha}_x) * \alpha_{max\_x}$, the maneuver time is recalculated as $t_{collision\_vehicle\_safe} = (vx_{vehicle\_at\_collision} - v0x_{vehicle})/\overline{\alpha}_x$, and the value of the other acceleration component is updated as $\overline{\alpha}_y = (vy_{vehicle\_at\_collision} - v0y_{vehicle})/t_{collision\_vehicle\_safe}$.

if ($\overline{\alpha}_x <= \alpha_{max\_x}$ & $\overline{\alpha}_y > \alpha_{max\_y}$), the acceleration is satisfied as $\tilde{\alpha}_y = \text{sign}(\overline{\alpha}_y) * \alpha_{max\_y}$, the maneuver time is recalculated as $t_{collision\_vehicle\_safe} = (vy_{vehicle\_at\_collision} - v0y_{vehicle})/\overline{\alpha}_y$, and the value of the other acceleration component is updated as $\overline{\alpha}x = (vFx_{vehicle\_at\_collision} - v0x_{vehicle})/t_{collision\_vehicle\_safe}$.

if ($\overline{\alpha}_x > \alpha_{max\_x}$ & $\overline{\alpha}_y > \alpha_{max\_y}$), the acceleration is satisfied as $\overline{\alpha}_y = \text{sign}(\overline{\alpha}_y) * \alpha_{max\_y}$, $\overline{\alpha}_x = \text{sign}(\overline{\alpha}_x) * \alpha_{max\_x}$ and the time until the collision point 50 is reached is recalculated as:

$$t_{collision\_vehicle\_safe} = \max[(vx_{vehicle\_at\_collision} - v0x_{vehicle})/\overline{\alpha}x, (vy_{vehicle\_at\_collision} - v0y_{vehicle})/\overline{\alpha}_y]$$

A loop via the vehicle path can then be provided with a step $\Delta x$ from the current position of the vehicle 1 ($x_0$, $y_0$) up to the expected collision point 50 ($x_{collision}$, $y_{collision}$). For each new x coordinate, the following equation can be solved in order to ascertain the time t at which the vehicle 1 reaches the waypoint ($x, y_{path\_vehicle}(x)$):

$$x(t) = x0 + v0x * t + 0.5 * \overline{\alpha}_x * t^2$$

The solution is $$t_{waypoint} = (-2 * v0x + \Delta^{0.5})/(2 * \overline{\alpha}_x),$$

wherein $$\Delta = 4 * v0x^2 - 8 * \overline{\alpha}_x * (x0 - x).$$

Subsequently, the trajectory waypoints ($t_{waypoint}, x$) and ($t_{waypoint}, y_{path\_vehicle}(x)$) can be stored.

The trajectory of the vehicle 1 from the collision point 50 ($x_{collision}, y_{collision}$) until the end point of the path ($x_F, y_F$) can then be calculated.

To calculate the trajectory, it is also possible, instead of a solution of $x(t) = x0 + v0x * t + 0.5 * \overline{\alpha}_x * t^2$, to solve the equation $d_k(t) = |v0| * t + 0.5 * |\overline{\alpha}| * t^2$, where dk is the incremental distance from the starting position, calculated as $d_k = d_{k-1} + \text{sqrt}(\Delta x^2 + (y_{path\_vehicle}(x_{k-1} + \Delta x) - y_{path\_vehicle}(x_{k-1}))^2)$, $x_k = x_{k-1} + \Delta_{x,0} = (v0x, v0y)$, $\overline{\alpha} = (\overline{\alpha}_x, \overline{\alpha}_y)$. This can possibly lead to a more accurate calculation, since both x and y movements are taken into account.

The above description of the embodiments describes the present invention exclusively in the context of examples. Of course, individual features of the embodiments, provided they make technical sense, can be freely combined with one another without departing from the scope of the present invention.

What is claimed is:

1. A method for monitoring a lane change of a vehicle, comprising the following steps:

ascertaining a collision point based on a movement specification, wherein the movement specification is specific for a planned movement of the vehicle along a path for carrying out the lane change;

checking for a possible collision of the vehicle with a road user based on the ascertained collision point and at least one state parameter of the vehicle;

determining an adjustment specification to avoid the possible collision, wherein the adjustment specification includes a calculated acceleration behavior of the vehicle; and providing the adjustment specification to monitor the lane change, wherein a trajectory for a collision-free lane change is determined based on the adjustment specification, and wherein determining the trajectory comprises:

calculating average accelerations required to perform the collision-free lane change, checking if the calculated average accelerations exceed predefined maximum acceleration limits, and if the maximum acceleration limits are exceeded, saturating the calculated average accelerations to the maximum acceleration limits and recalculating a maneuver time for the trajectory based on the saturated accelerations.

2. The method according to claim 1, wherein the ascertaining of the collision point includes the following steps:

ascertaining the path for carrying out the lane change;

ascertaining a path along which a movement of the road user is predicted;

comparing the ascertained path for carrying out the lane change and the path along which the movement of the road user is predicted, the collision point being ascertained based on the comparison.

3. The method according to claim 1, wherein the checking for the possible collision includes the following steps:

calculating a time period that the vehicle requires to reach the collision point, based on the at least one state parameter;

calculating a time period that the road user requires to reach the collision point, based on at least one state parameter of the road user;

comparing the calculated time period that the vehicle requires to reach the collision point and the calculated time period that the road user requires to reach the collision point, the checking predicting the collision based on the comparison.

4. The method according to claim 1, wherein the road user is a further vehicle, a list of multiple detected vehicles being provided, and the road user being selected from the list.

5. The method according to claim 1, wherein the movement specification and/or the state parameter is ascertained by a measurement of the vehicle speed, and is provided by a driver assistance system and/or an autonomous vehicle function.

6. The method according to claim 1, wherein the adjustment specification is provided for a driver assistance system and/or an autonomous vehicle function, control of the vehicle being initiated based on the adjustment specification, including the calculated acceleration behavior of the vehicle and/or the trajectory, to carry out the lane change by a driver assistance system and/or an autonomous vehicle function.

7. A non-transitory computer-readable medium on which is stored a computer program including commands for monitoring a lane change of a vehicle, the commands, when executed by a computer, causing the computer to perform the following steps:

ascertaining a collision point based on a movement specification, wherein the movement specification is specific for a planned movement of the vehicle along a path for carrying out the lane change;

checking for a possible collision of the vehicle with a road user based on the ascertained collision point and at least one state parameter of the vehicle;

determining an adjustment specification to avoid the possible collision, wherein the adjustment specification includes a calculated acceleration behavior of the vehicle; and providing the adjustment specification to monitor the lane change, wherein a trajectory for a collision-free lane change is determined based on the adjustment specification, and wherein determining the trajectory comprises:

calculating average accelerations required to perform the collision-free lane change, checking if the calculated average accelerations exceed predefined maximum acceleration limits, and if the maximum acceleration limits are exceeded, saturating the calculated average accelerations to the maximum acceleration limits and recalculating a maneuver time for the trajectory based on the saturated accelerations.

8. A device for data processing configured to monitor a lane change of a vehicle, the device configured to:

ascertain a collision point based on a movement specification, wherein the movement specification is specific for a planned movement of the vehicle along a path for carrying out the lane change;

check for a possible collision of the vehicle with a road user based on the ascertained collision point and at least one state parameter of the vehicle;

determine an adjustment specification to avoid the possible collision, wherein the adjustment specification includes a calculated acceleration behavior of the vehicle; and provide the adjustment specification to monitor the lane change, wherein a trajectory for a collision-free lane change is determined based on the adjustment specification, and wherein determining the trajectory comprises:

calculating average accelerations required to perform the collision-free lane change, checking if the calculated average accelerations exceed predefined maximum acceleration limits, and if the maximum acceleration limits are exceeded, saturating the calculated average accelerations to the maximum acceleration limits and recalculating a maneuver time for the trajectory based on the saturated accelerations.

* * * * *